(12) United States Patent
Kajiwara

(10) Patent No.: US 7,844,982 B2
(45) Date of Patent: Nov. 30, 2010

(54) OPTICAL PICK-UP AND OPTICAL RECORDING/REPRODUCING APPARATUS WITH A PROTECTIVE COVER

(75) Inventor: Keiichiroh Kajiwara, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 703 days.

(21) Appl. No.: 11/822,994

(22) Filed: Jul. 11, 2007

(65) Prior Publication Data

US 2008/0019230 A1 Jan. 24, 2008

(30) Foreign Application Priority Data

Jul. 21, 2006 (JP) ............... 2006-199836

(51) Int. Cl.
*G11B 17/03* (2006.01)
(52) U.S. Cl. .................................... 720/655
(58) Field of Classification Search ........... 720/655, 720/671
See application file for complete search history.

(56) References Cited

U.S. PATENT DOCUMENTS 6,430,143 B1 * 8/2002 Kajiyama et al. ........... 720/671

FOREIGN PATENT DOCUMENTS

| CN | 1848262 | 10/2006 |
|---|---|---|
| JP | 62-34340 | 2/1987 |
| JP | 62-142720 | 9/1987 |
| JP | 3-028531 | 3/1991 |
| JP | 06005062 A * | 1/1994 |
| JP | 9-167366 | 6/1997 |
| JP | 2000-215466 | 8/2000 |
| JP | 2002-269790 | 9/2002 |
| JP | 2004-86956 | 3/2004 |
| JP | 2005-129134 | 5/2005 |
| JP | 2005-251246 | 9/2005 |
| JP | 2006-12302 | 1/2006 |
| JP | 2006-302334 | 11/2006 |

\* cited by examiner

*Primary Examiner*—David D Davis
(74) *Attorney, Agent, or Firm*—Morrison & Foerster LLP

(57) ABSTRACT

The present invention provides an optical pick-up device and an optical recording/reproducing apparatus both of which can realize (i) a stable component accuracy, (ii) improvement in productivity, and (iii) low cost, without damaging an optical disk. The optical pick-up device that reproduces/records information from/onto an optical information storage medium by means of a laser beam, includes: a housing, which is a cabinet covering inner components of the optical pick-up device, having an opening section at least on a surface that faces the optical information storage medium when the optical information storage medium is set in place; and a protective cover that protects the opening section of the housing, wherein the protective cover is integrally formed with the housing.

2 Claims, 11 Drawing Sheets

E-E'

F-F'

OPTICAL PICK-UP AND OPTICAL RECORDING/REPRODUCING APPARATUS WITH A PROTECTIVE COVER This Nonprovisional application claims priority under 35 U.S.C. §119(a) on Patent Application No. 199836/2006 filed in Japan on Jul. 21, 2006, the entire contents of which are hereby incorporated by reference.

FIELD OF THE INVENTION

The present invention relates to an optical pick-up device used for recording and/or reproducing of optical information onto/from an optical information storage medium such as an optical disk, and an optical recording/reproducing apparatus including the optical pick-up device.

BACKGROUND OF THE INVENTION

Conventionally, an optical pick-up device is used for recording and/or reproducing of information onto/from an optical information storage medium such as an optical disk. The optical pick-up device carries out recording and/or reproduction of information by, for example, (i) converging with an objective lens a light beam, which is emitted from a laser source, so that a recording surface or a reproducing surface of the optical disk is irradiated with the light beam, and (ii) detecting light reflected from the recording surface or the reproducing surface.

At the recording and/or the reproduction of information, the objective lens may collide with an optical disk due to a warpage of an optical disk or a defect in an optical pick-up device. As a mechanism for preventing the collision, a protective member is known.

Moreover, it is well known that a protective cover (actuator cover) in the vicinity of a lens holder for the purpose of (i) protect a mechanism including a lens holder and a lens driving section (both of which is included in an actuator unit) and (ii) prevent the mechanism from being contaminated.

With reference to FIGS. 9 through 11, an arrangement of a conventional optical pick-up device is explained below. A slim combo pick-up device is assumed as the conventional optical pick-up device. The slim combo pick-up device includes a DVD laser light source unit 140 and a CD laser light source unit 150.

FIG. 9 is a diagram illustrating an arrangement of the conventional optical pick-up device. FIG. 9 shows one example of each of (i) an arrangement of a typical slim combo pick-up device that records/reproduces information onto/from an optical disk 160 (Refer to FIG. 10) that is an optical storage medium, (ii) a housing 110, (iii) an actuator unit 120, and (iv) a protective cover 130 for protecting the actuator unit 120. (a) of FIG. 9 is a plan view of the optical pick-up device, and (b) of FIG. 9 is a back view thereof. FIG. 10 is a cross sectional view taken along F-F' of the actuator unit 120 in (a) of FIG. 9, and illustrates an arrangement that includes the optical disk 160, an objective lens 121, a lens protector 127, and a protective cover 130 when the arrangement in (a) of FIG. 9 is viewed in a focus direction. FIG. 11 is a diagram illustrating the actuator unit 120 in details. (a) of FIG. 11 is a plan view of the actuator unit 120 and (b) of FIG. 11 is a side view illustrating a side surface of the actuator unit 120 in (a) of FIG. 11.

In the slim combo pick-up device, a laser beam emitted from each of the laser light source units 140 and 150 passes through a special optical component. Then, a raising mirror 145 changes an optical axis direction of the laser beam according to a direction in which a recording surface of the optical disk 160 is irradiated with the laser beam. Subsequently, the laser beam is converged onto the optical disk 160 with the objective lens 121 so that reading/writing of disk information is carried out.

Next, an actuator unit 120 of the optical pick-up device is explained with reference to FIGS. 10 and 11.

A magnetic circuit is formed with a tracking coil magnet (not shown), as a mechanism for shifting in a radial direction a lens holder 122 which holds the objective lens 121. Moreover, another magnetic circuit is formed with a focusing coil magnet (not shown), as a mechanism for shifting the lens holder 122 in a focus direction.

The lens holder 122 is suspended by thin wires 125 extended from the actuator base 126, and included in the actuator unit 120. The actuator unit 120 is fixed in the housing 110 in FIG. 9.

For example, Patent Document 1 discloses a proposal for improving the problem of a collision between the protective cover 130 and the optical disk 160 which problem occurs when a recent thin-model notebook computer writes information onto the optical disk 160, particularly a commercially available optical disk having a lot of run out.

In the arrangement of Patent Document 1, the protective cover 130, which is a component separate from the housing 110, is attached to the actuator unit 120, and a protrusion is provided on a surface of the protective cover 130 which surface faces the optical disk 160. This arrangement requires to maintain a high component accuracy. Moreover, additional material cost and operation cost occur for the attachment of the separate component. Furthermore, a conventional cover is often made of thin sheet metal or thin molded resin, which, however, causes the problem of insufficient strength of the conventional cover.

Patent Document 2 discloses a conventional art in which a protective cover 130, which is separately provided in the actuator unit 120, has the function of protecting the mechanism in the actuator unit 120 and the function of protecting the mechanism in the actuator unit 120 from dust.

Furthermore, Patent Document 3 discloses an arrangement in which a surface of a protective cover 130 which surface faces an optical disk 160 is curved. The curved surface makes it difficult that turbulent airflow flows into a hole, and thus keeps dust floating in the air off the hole.

However, the conventional optical pick-up device and the conventional optical recording/reproducing apparatus have the following problem. Namely, it is difficult to provide an optical pick-up device and an optical recording/reproducing apparatus both of which can realize (i) a stable component accuracy, (ii) improvement in productivity, and (iii) low cost, without damaging an optical disk.

More specifically, the following problem occurs.

A conventional mechanism for preventing the collision between the optical disk 160 and the objective lens 121 in the above-mentioned Patent Documents 1 through 3 is realized by providing the protective cover 130 or the protruding lens protector 127 in vicinity of the objective lens 121 of the lens holder 122.

The lens protector 127 can function as a mechanism for preventing a collision between the optical disk 160 and the objective lens 121 when the objective lens 121 is driven in a focus direction.

However, the lens protector 127 does not function as a protector of the actuator unit 120, when the optical pick-up device is not in operation or when the optical pick-up device is being produced or assembled.

Accordingly, in order to protect the actuator unit 120 during the aforesaid occasions, the protective cover 130 needs to be attached to the housing 110.

Patent Document 2 discloses a method of engaging the housing 110 with the protective cover 130 so that a positioning accuracy of the housing 110 and the protective cover 130 is improved. In each case, attachment of the separate protective cover 130 is necessary for obtaining the housing 110 provided with the protective cover 130. This leads to the problems of increase in component cost, increase in operation cost for the attachment, unstable component accuracy, and insufficient component strength.

[Patent Document 1] Japanese Unexamined Patent Publication No. 251246/2005 (Tokukai 2005-251246 (published on Sep. 15, 2005))

[Patent Document 2] Japanese Unexamined Utility Model Publication No. 142720/1987 (Jitsukaishou 62-142720 (published on Sep. 9, 1987))

[Patent Document 3] Japanese Unexamined Utility Model Publication No. 28531/1991 (Jitsukaihei 3-28531 (published on Mar. 22, 1991))

SUMMARY OF THE INVENTION

An object of the present invention is to provide an optical pick-up device and an optical recording/reproducing apparatus both of which can realize (i) a stable component accuracy, (ii) improvement in productivity, and (iii) low cost, without damaging an optical disk.

In order to solve the problem mentioned above, an optical pick-up device of the present invention is an optical pick-up device that reproduces/records information from/onto an optical information storage medium by means of a laser beam, the optical pick-up device including: a housing, which is a cabinet covering inner components of the optical pick-up device, having an opening section at least on a surface that faces the optical information storage medium when the optical information storage medium is set in place; and a protective cover that protects the opening section of the housing (a surface of the housing where the opening section is provided), wherein the protective cover is integrally formed with the housing.

According to the invention, the protective cover is integrally formed with the housing. This can realize (i) a stable component accuracy, (ii) improvement in productivity, and (iii) low cost. Moreover, the integral formation realizes a seamless connection between the protective cover and the housing. This allows for a curved external surface of a boundary part between the protective cover and the housing. This arrangement is less likely to damage the optical information storage medium.

In order achieve the object mentioned above, an optical recording/reproducing apparatus of the present invention includes the optical pick-up device.

According to the invention, the protective cover is formed integrally with the housing. This makes it possible to produce the optical recording/reproducing apparatus both of which realizes (i) a stable component accuracy, (ii) improvement in productivity, and (iii) low cost. Moreover, this realizes a seamless connection between the protective cover and a housing. Therefore, it becomes possible to produce the optical recording/reproducing apparatus that does not damage the optical disk.

For a fuller understanding of the nature and advantages of the invention, reference should be made to the ensuing detailed description taken in conjunction with the accompanying drawings.

DESCRIPTION OF THE EMBODIMENTS

Best mode for carrying out the present invention is explained below with reference to FIGS. 1 through 8.

Figure 1:
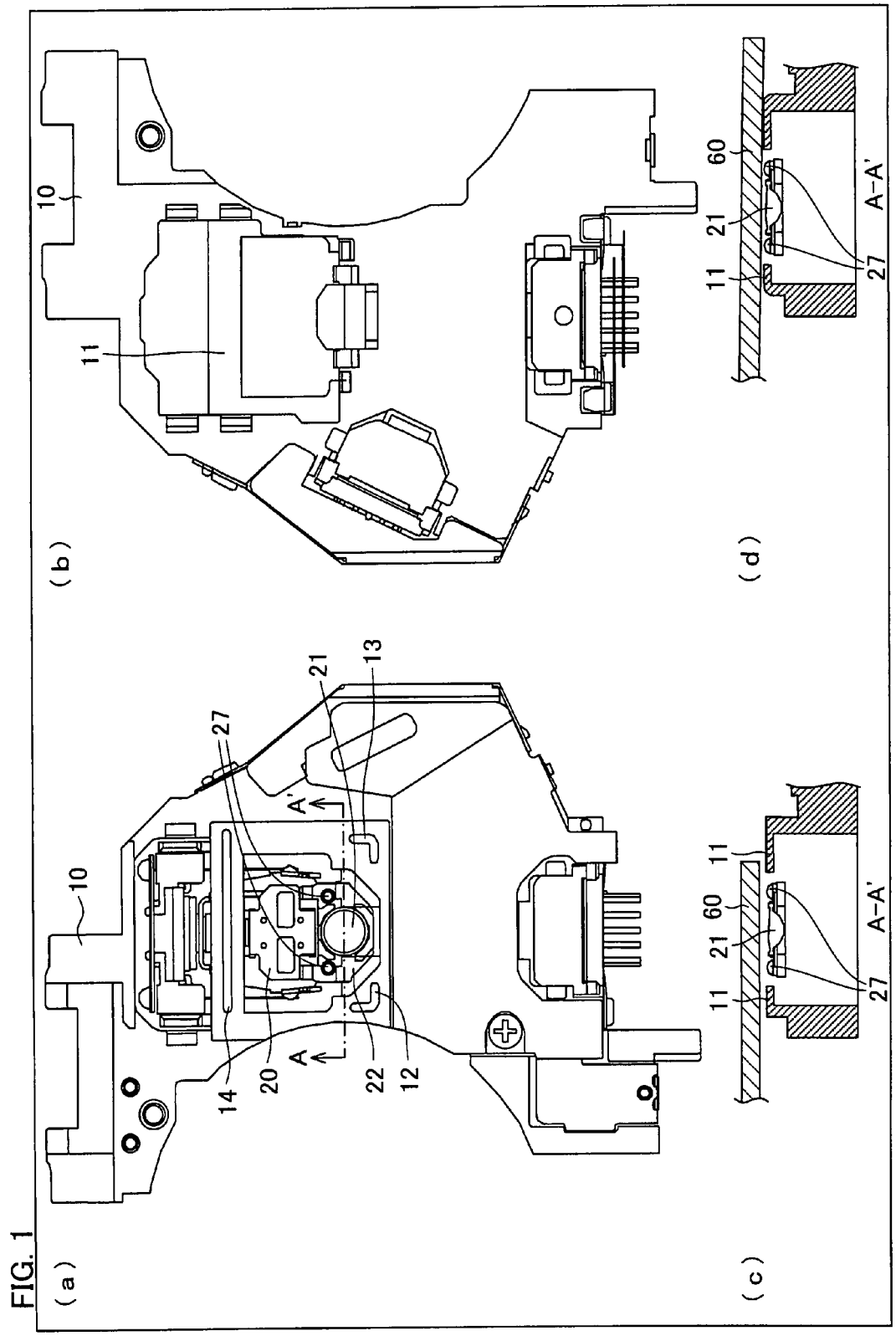
FIG. 1 is a diagram illustrating one embodiment of an optical pick-up device of the present invention. (a) is a plan view of the optical pick-up device. (b) is a back view thereof. (c) is a cross sectional view illustrating a cross section taken along A-A' of (a). (d) is a cross sectional view illustrating another example of the cross section taken along A-A' of (a).

FIG. 1 is a diagram illustrating an optical pick-up device of the present embodiment. (a) of FIG. 1 is a plan view of the optical pick-up device. (b) of FIG. 1 is a back view thereof. (c) of FIG. 1 is a cross sectional view illustrating a cross section taken along A-A' of (a) of FIG. 1. (d) of FIG. 1 is a cross sectional view illustrating a cross section taken along A-A' of (a) of FIG. 1, according to another embodiment of the present invention. The optical pick-up device of the present invention is characterized in that a housing 10 and a protective cover section 11 are integrally formed, as illustrated in (c) of FIG. 1 and (d) of FIG. 1.

In (b) of FIG. 1 illustrating a back surface, an actuator unit 20 is removed for the purpose of clearly showing the housing 10 of the present invention.

Figure 2:
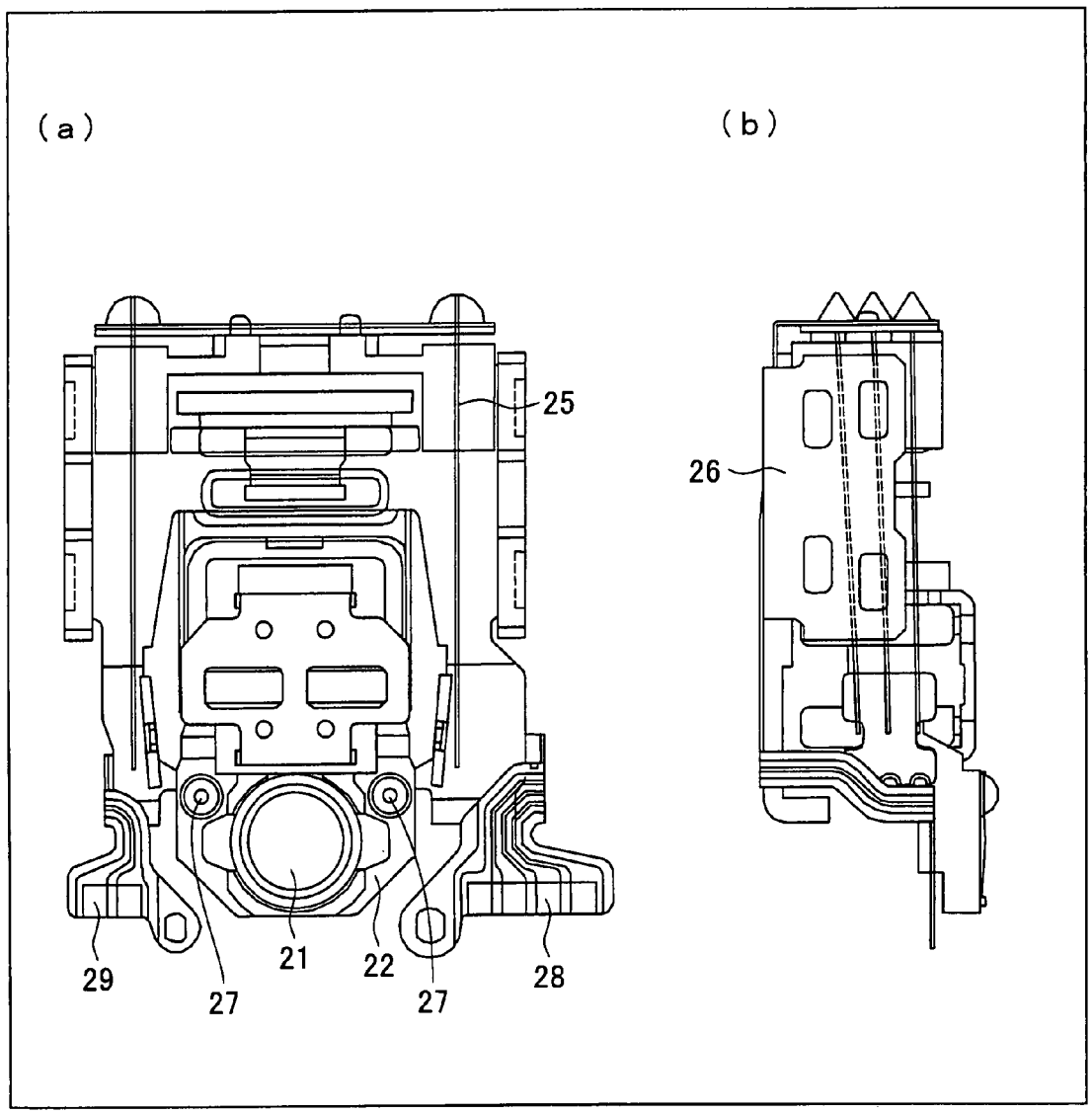
FIG. 2 is a diagram illustrating one embodiment of an optical pick-up device of the present invention. (a) is a plan view of an actuator unit. (b) is a side view of the actuator unit.

An arrangement of the actuator unit 20 is not specifically limited in the present invention. In the present invention, the actuator unit 20 is assumed to employ a unit equivalent to a conventional actuator unit. A specific example of such an actuator unit is the actuator unit 20 as illustrated in FIG. 2. (a) of FIG. 2 is a plan view of the actuator unit 20, and (b) of FIG. 2 is a side view of the actuator unit 20.

As illustrated in FIG. 2, in the actuator unit 20, a magnetic circuit is formed with a tracking coil magnet (not shown) as a mechanism for shifting a lens holder 22 in a radial direction which lens holder 22 includes an objective lens 21. Moreover, another magnetic circuit is formed with a focusing coil magnet (not shown) as a mechanism for shifting the lens holder 22 in a focus direction.

The lens holder 22 is suspended by thin wires 25 extended from an actuator base 26 and included in the actuator unit 20. The actuator unit 20 is fixed in the housing 10 illustrated in FIG. 1. The lens holder 22 includes protectors 27 that protect the objective lens 21.

The housing 10 as illustrated in FIG. 1 is integrally formed with the protective cover section 11. By integrally forming the protective cover section 11 with the housing 10, it becomes possible to protect the actuator unit 20 and to prevent a collision between the objective lens 21 and the optical disk 60. Moreover, it also becomes possible to increase not only strength of the protective cover section 11 but also strength of the entire housing 10.

The integral formation of the protective cover section 11 and the housing 10 eliminates a joint between the protective cover section 11 and the housing 10. Moreover, as illustrated in (d) of FIG. 1, an outer shape of the joint between the protective cover section 11 and the housing 10 are formed so as to have a curved surface. This is also effective in reducing a possibility of damage to the optical disk 60.

Furthermore, the integral formation eliminates a need to attach the protective cover section 11 to the housing 10. This can realize production of components with a stable component accuracy, improvement in productivity, and a low cost.

According to a conventional method, it is necessary to widely open an opening section for insertion of the actuator unit 20 so that fixing means or the like is formed to fix the protective cover section 11.

Figure 3:
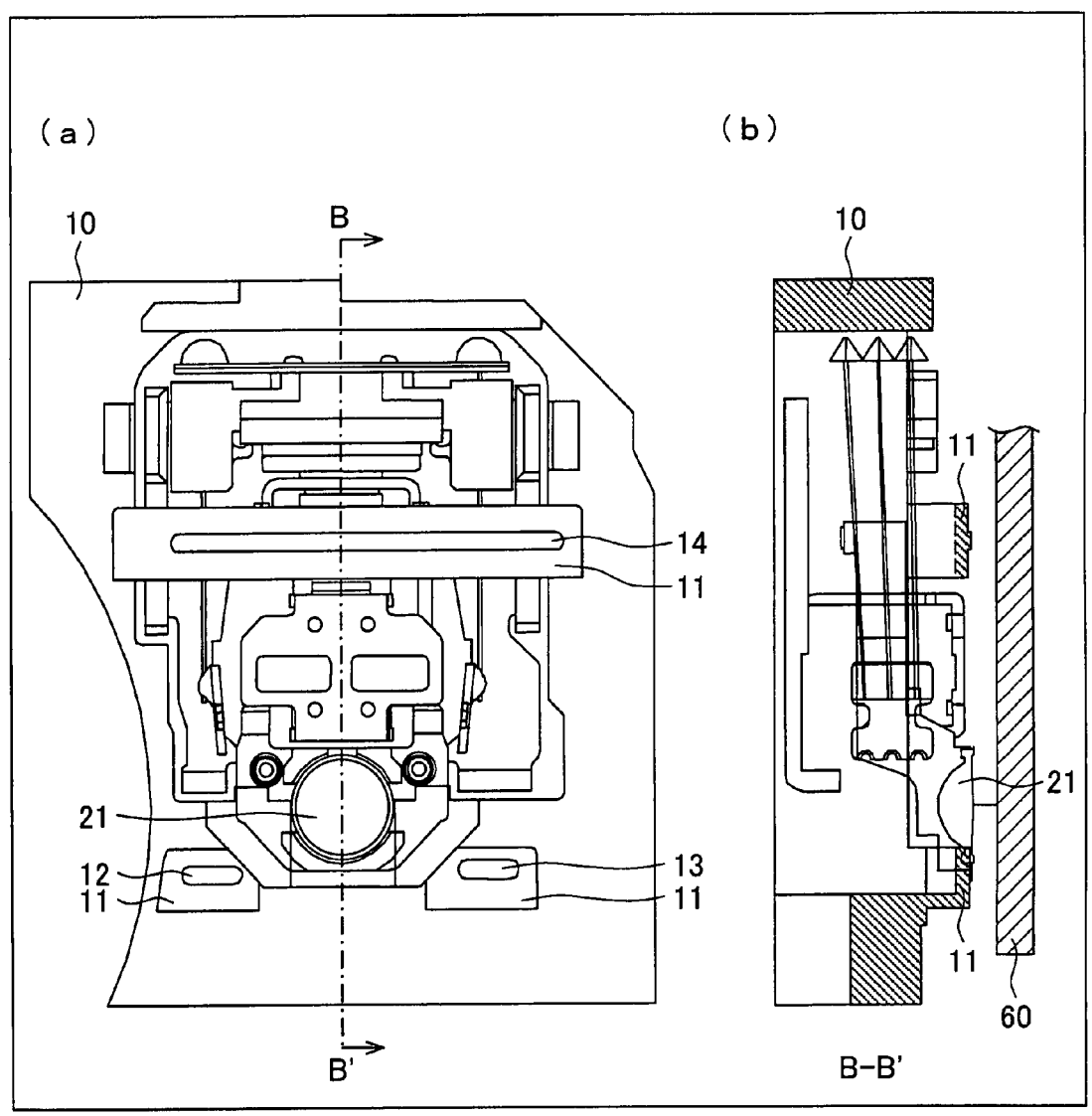
FIG. 3 is a magnified diagram of an actuator-unit-mounted section in the optical pick-up device of the present invention. (a) is a plan view of the actuator unit. (b) is a cross sectional view illustrating a cross section taken along B-B' of (a).

The present embodiment is characterized by integrally forming the housing 10 with the protective cover section 11 that is provided for an actuator inserting opening (opening section for insertion of the actuator unit 20). FIG. 3 is a magnified diagram of an actuator-mounted section of the optical pick-up device of the present embodiment. (a) of FIG. 3 is a plan view of the actuator unit 20. (b) of FIG. 3 is a cross sectional view illustrating a cross section taken along B-B' of (a) of FIG. 3. The actuator unit 20 is covered by the housing 10 from the top of the actuator unit 20, or, alternatively, the actuator unit 20 is inserted from the bottom of the housing 10. Then, a position of the actuator unit 20 is adjusted and the actuator unit 20 is fixed to the position.

Namely, it is not necessary to form fixing means or the like for fixing the protective cover section 11, according to a method of the present embodiment. Therefore, it is not necessary to widely open the opening section for inserting the actuator unit 20. In other words, strength of the housing 10 can be improved.

In the above description, the protective cover section 11 is integral with the housing 10 in the actuator unit 20. As illustrated in (a) of FIG. 3, protrusions 12, 13, and 14 can be additionally formed on the surface of the protective cover section 11.

The provision of the protrusions 12, 13, and 14 makes it possible to prevent a collision between the optical disk 60 and the protective cover section 11 and a scratch on the optical disk 60, as in Patent Document 1. Moreover, according to the method of the present invention, the above mentioned structure is formed by an integral formation. This eliminates the occurrence of the problem that occurs in an assembly process in Patent Document 1. In other words, the method in Patent Document 1 requires material cost and operation cost for pursuit of component accuracy of the housing and the protective cover section and/or for the attachment of the separate components. Moreover, the structure disclosed in Patent Document 1 requires consideration of (i) a need for fixing means (hook section or the like) with which the protective cover is fixed to the housing, (ii) a need for additional means for securing the strength of the housing against increase of an actuator-unit-insertion opening section which increase is needed for the formation of the fixing means, and the like. However, such considerations are not necessary in the production process according to the present embodiment.

Figure 4:
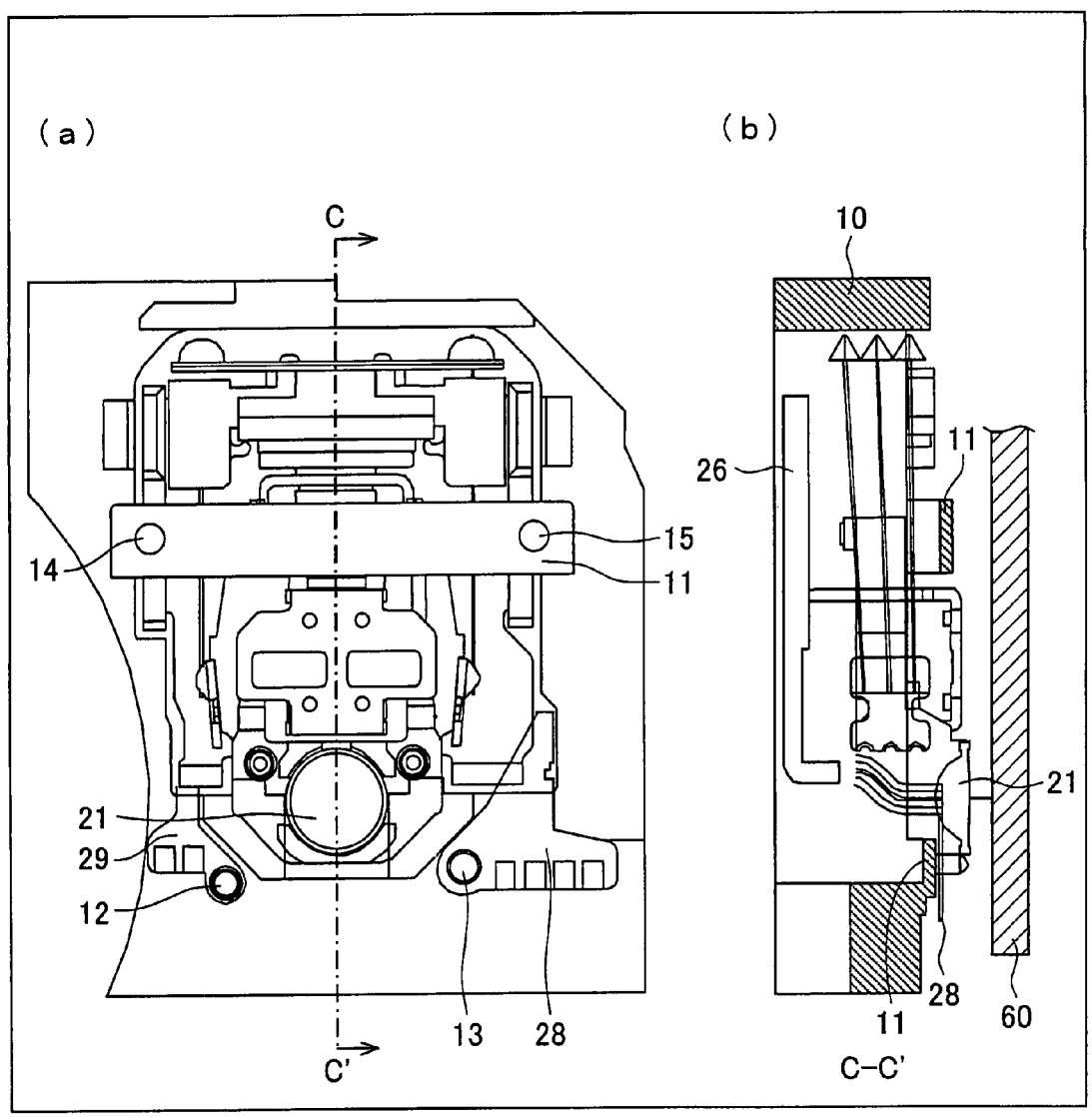
FIG. 4 is a magnified diagram of another actuator-unit-mounted section in the optical pick-up device of the present invention. (a) is a plan view of the actuator unit. (b) is a cross sectional view illustrating a cross section taken along C-C' of (a).

Hemispherical protrusions may be formed on the protective cover section 11 at four positions (12, 13, 14, and 15) in vicinity of the periphery corners of the protective cover section 11, as illustrated in (a) of FIG. 4 which is a plan view of the optical pick-up device and (b) of FIG. 4 which is a cross sectional view illustrating a cross section taken along C-C' of (a) of FIG. 4.

As illustrated in FIG. 2, the actuator unit 20 requires the magnetic circuits or the like to be formed therein for transmission of information stored in the optical disk 60 and for the servo-control in a focus direction and in a tracking direction with respect to the optical disk 60. Therefore, a driving circuit board (FPC Board: Flexible Printed Circuit Board) is provided in the actuator unit 20. The driving circuit board is connected to a driving circuit at the junction sections 28 and 29.

In the present embodiment, the protrusions may be formed in a pin shape (cylindrical shape) on the protective cover section 11 of the housing 10. The protrusions may double as members for determining positions of the junction sections 28 and 29 which are connected to the driving circuit board used for control of the actuator unit 20. According to the above arrangement, for example, protrusions 12 and 13 in (a) of FIG. 4 pass completely through holes provided to the driving circuit board and fix positions of the junction sections 28 and 29 connected to the driving circuit board.

Figure 5:
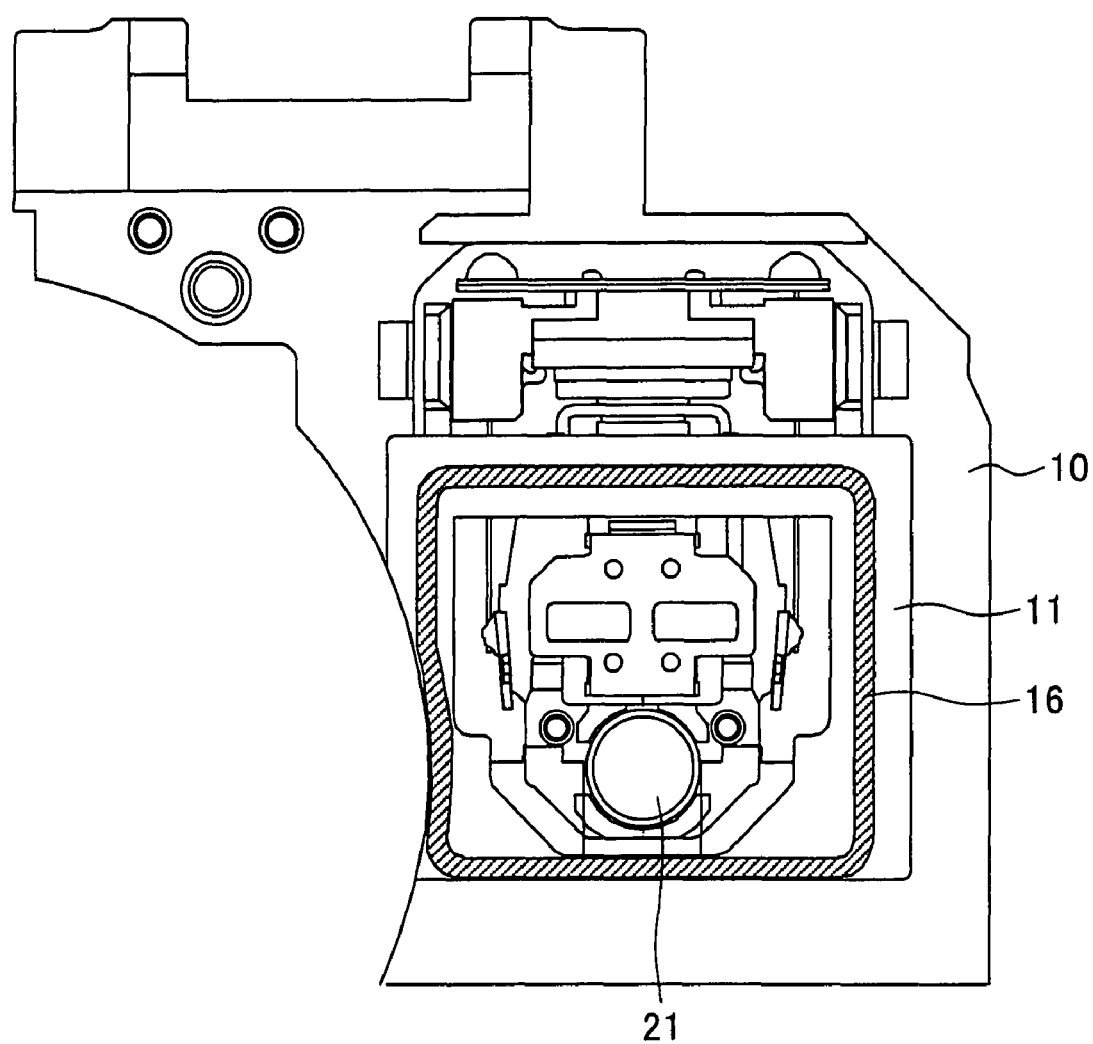
FIG. 5 is a magnified plan view of yet another actuator-unit-mounted section in the optical pick-up device of the present invention.

Further, the protrusions on the protective cover section 11 may be a protrusion 16 illustrated in FIG. 5. The protrusion 16 is seamlessly formed all around the opening section.

A shape of a top end of each of the protrusions 12 through 16 is not specifically limited. However, it is preferable that the top end has a curved surface without a corner.

After being positioned with respect to the housing 10, the actuator unit 20 is fixed to the housing 10 by bonding. As illustrated in a plan view ((a) of FIG. 6) of the actuator unit 20 and a cross sectional view ((b) of FIG. 6) of a cross section taken along D-D' of (a) of FIG. 6, adhesive filling holes 17 may be provided to the protective cover section 11, as sections filled with an adhesive for adhering the actuator unit 20 to the housing 10.

Figure 6:
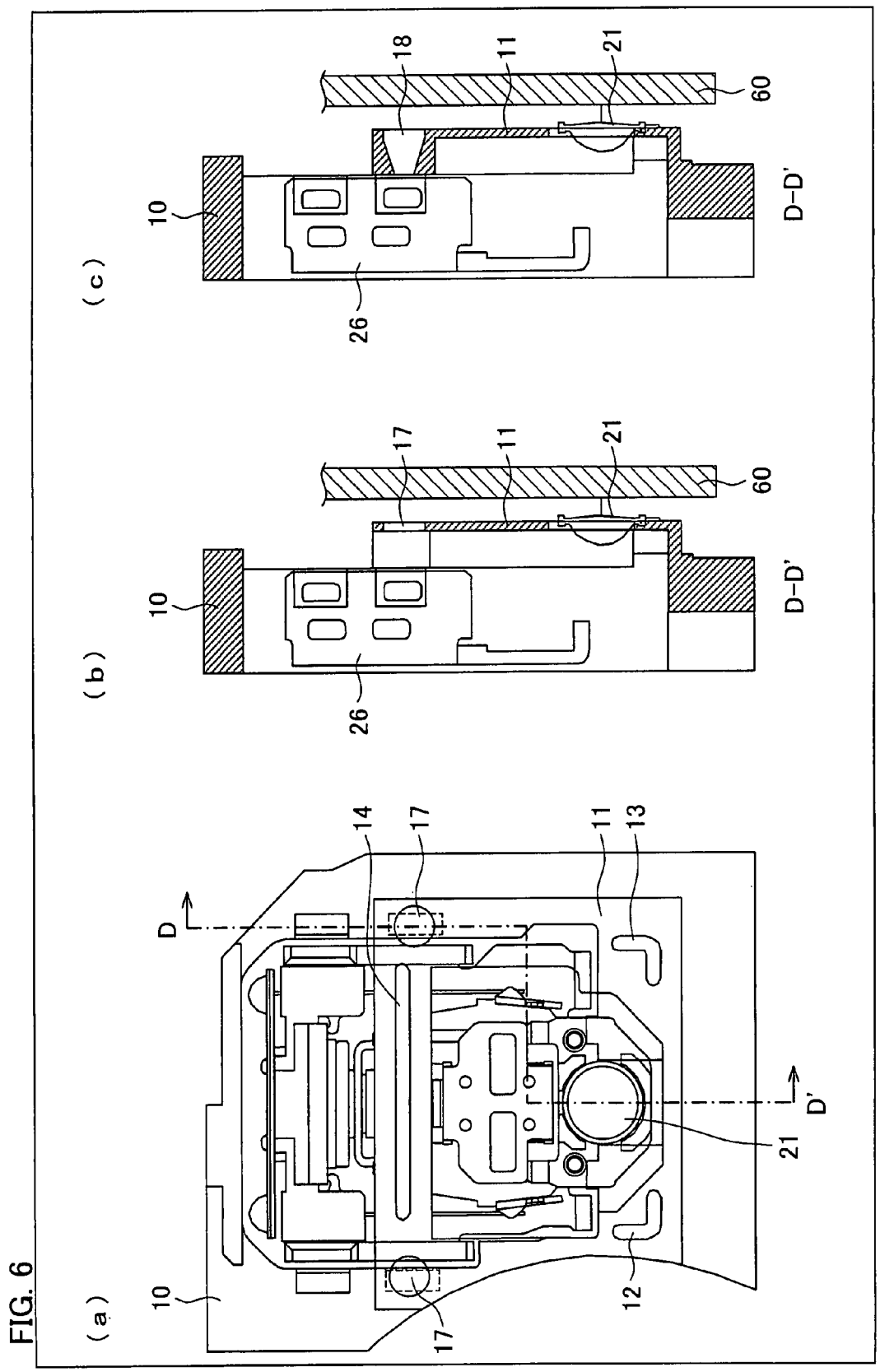
FIG. 6 is a magnified diagram of a still another actuator-unit-mounted section in the optical pick-up device of the present invention. (a) is a plan view of the actuator unit. (b) is a cross sectional view illustrating a cross section taken along D-D' of (a). (c) is a cross sectional view illustrating another example of the cross section taken along D-D' of (a).

Alternatively, as illustrated in (c) of FIG. 6 that is another cross sectional view of the cross section D-D' of (a) of FIG. 6, adhesive storing sections 18 may be provided so as to have a structure such that the adhesive can be stored in the adhesive filling holes 17.

A material for the housing 10 is not limited to metal. Alternatively, resin may be used as the material for the housing 10. The housing 10 can be produced easily by molding general-purpose metal-replacement resin.

An applicable example of such resin is PPS (Polyphenylensulfid) resin known as metal-replacement resin. The PPS resin can satisfy demanded conditions concerning strength and heat conductance by mixing various fillers therewith.

As mentioned above, the optical pick-up device and the optical recording/reproducing apparatus of the present invention is characterized in that the protective cover section 11 of the actuator unit 20 is integrally formed with the housing 10.

Accordingly, the protective cover section 11 of the actuator unit 20 and the housing 10 becomes one component. This can realize (i) a stable accuracy of components, (ii) improvement in productivity, and (iii) low cost. Namely, component accuracy of the optical pick-up device and the optical recording/reproducing apparatus of the present invention varies depending only on an accuracy of a metal mold and does not vary due to engagement of the protective cover section 11 with the housing 10.

Moreover, the integral formation of the protective cover section 11 and the housing 10 results in increasing strength of an entire housing. The integral formation also enables seamless connection between the protective cover section 11 and the housing 10. This makes it possible to provide an optical pick-up device and an optical recording/reproducing apparatus both of which can record/reproduce/delete information without any damage to the optical disk 60.

Figure 7:
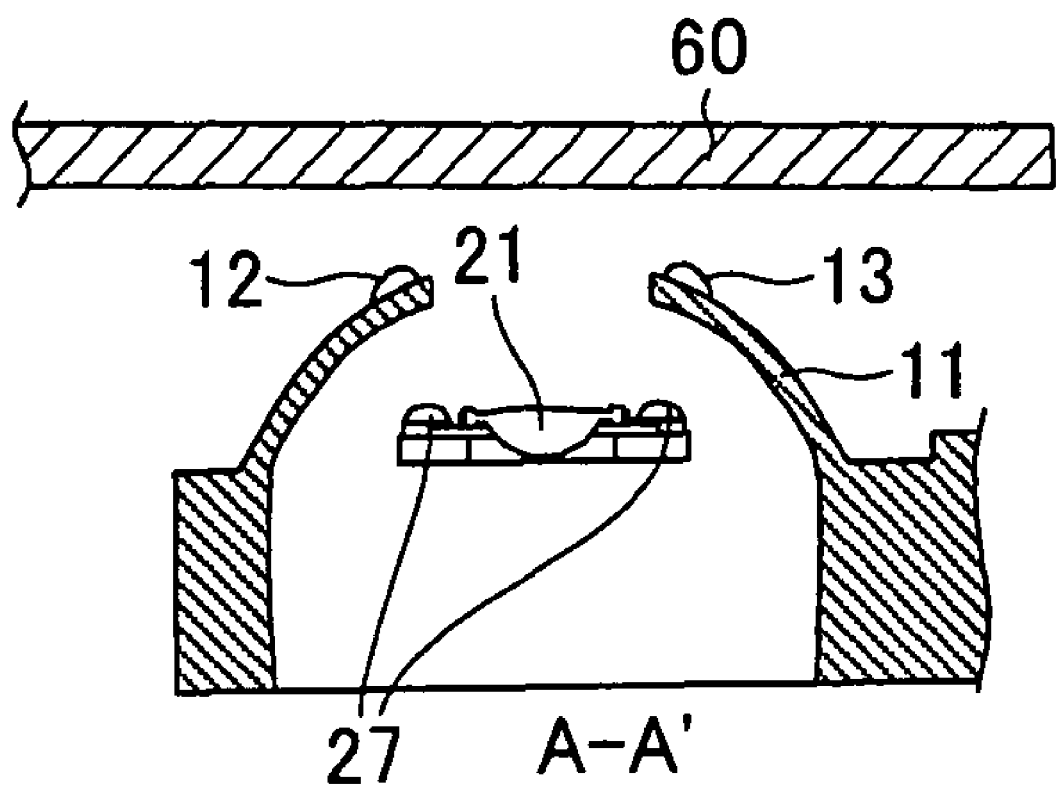
FIG. 7 is a diagram illustrating one embodiment of the optical pick-up device of the present invention and a cross sectional view illustrating another modified example of the cross section taken along A-A' in (c) of FIG. 1.

Because the protective cover section 11 and the housing 10 are integrally formed with the use of a metal mold, it becomes possible to realize the arrangement as in Patent Document 3 in the present embodiment. Moreover, as an extension of the arrangement as illustrated in (c) of FIG. 1, it becomes possible to realize an arrangement as illustrated in FIG. 7. In the arrangement illustrated in FIG. 7, a top of a movable range of the objective lens (in the focus direction) is arranged to become a top of a cone (hemisphere). Because the protective cover section 11 and the housing 10 are integrally formed so as to be conical (hemispherical), possibility of damaging the optical disk 60 is reduced even in a case where the protective cover section 11 collides with the optical disk 60.

In other words, the integral formation realizes increase in strength of both of the housing and the protective cover section. At the same time, the integral formation promises to bring a significant value engineering effect. Therefore, it becomes possible to reduce cost of parts for the protective cover section, production cost of the metal mold of the protective cover, and the number of man-hours needed for an assembly process.

Figure 8:
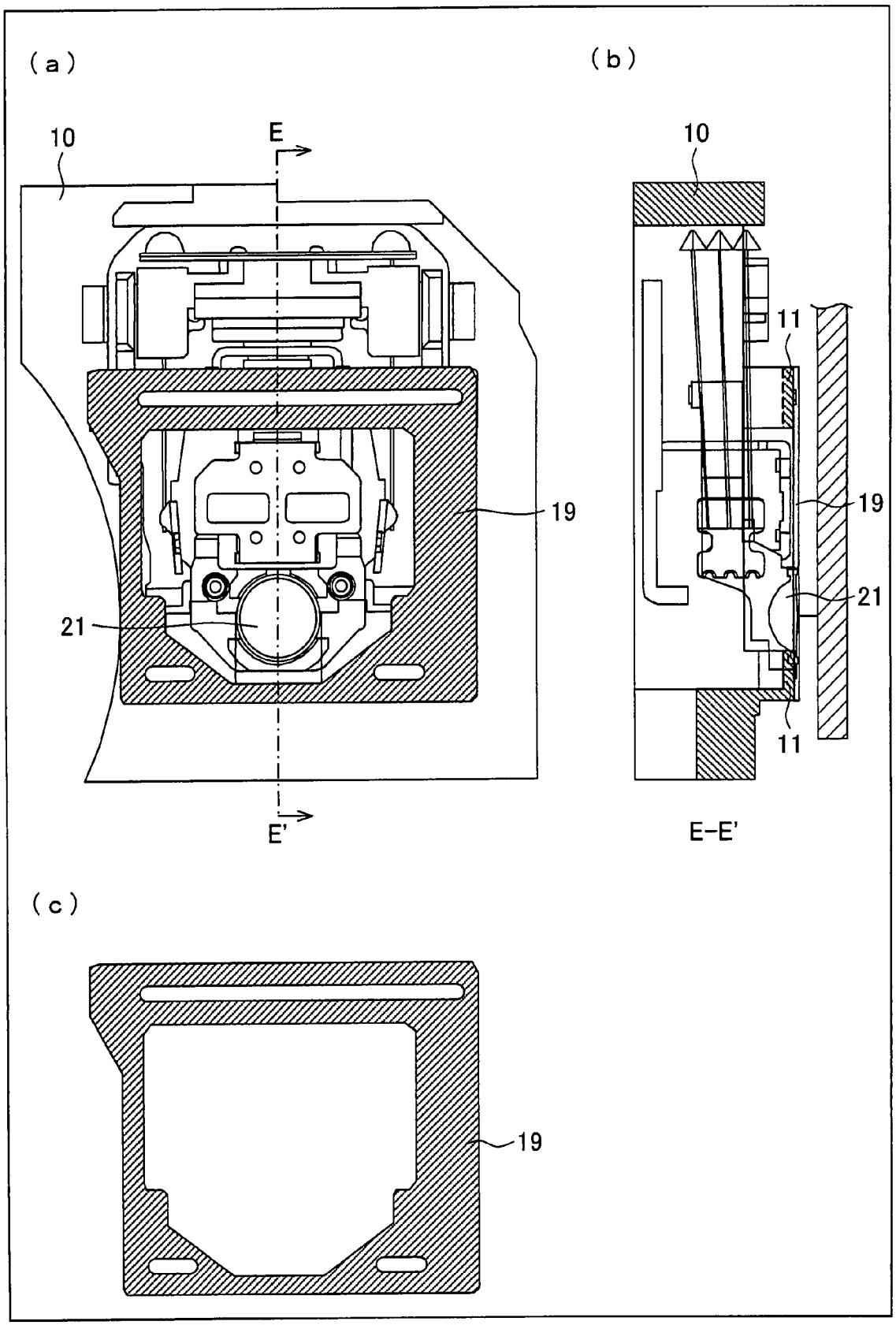
FIG. 8 is a magnified diagram of an actuator-unit-mounted section in the optical pick-up device of the present invention, and is a modified example of FIG. 3. (a) is a plan view of the actuator unit. (b) is a cross sectional view illustrating a cross section taken along E-E' of (a). (c) is a plan view of a decorative board.
Figure 9:
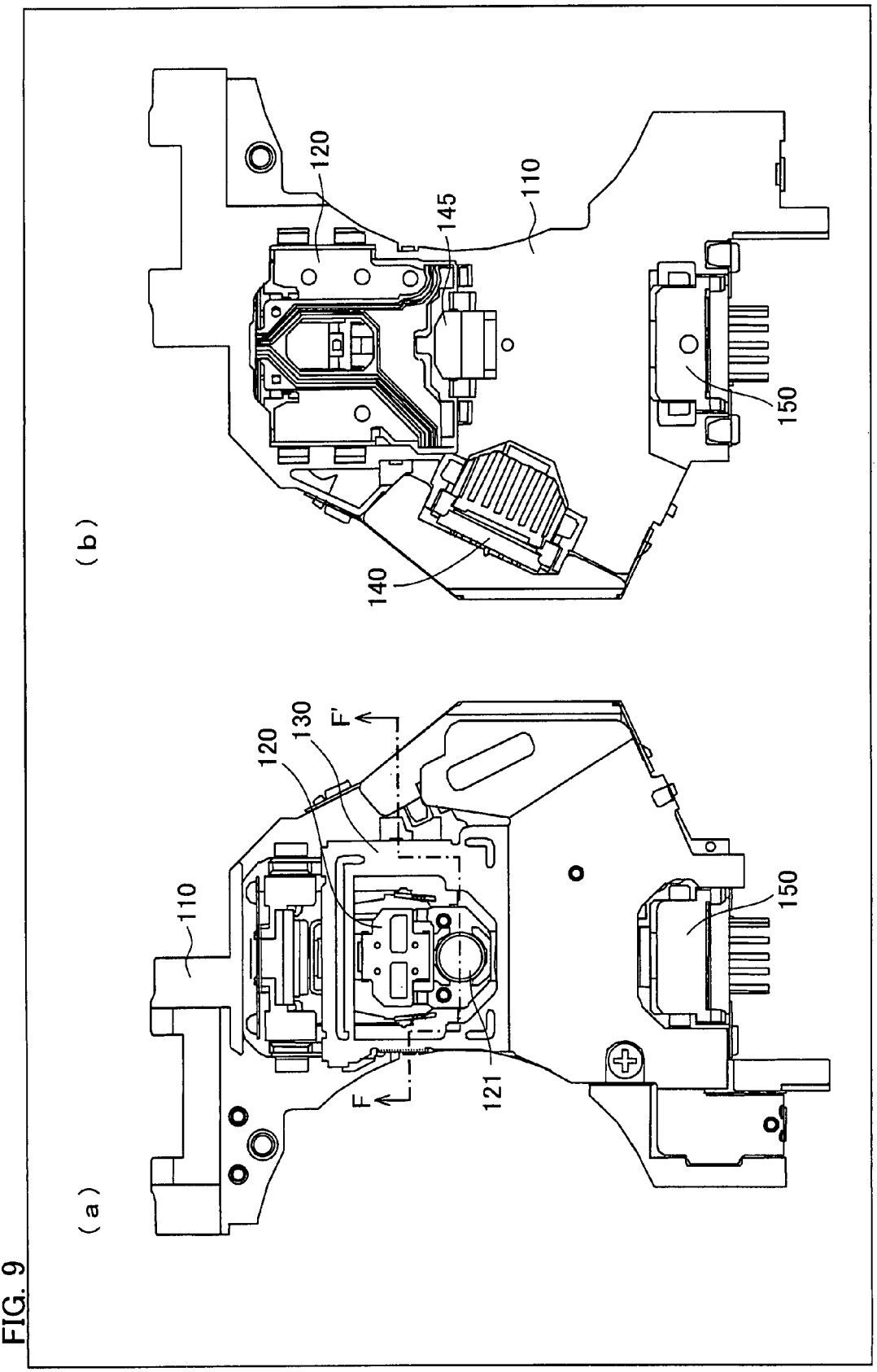
FIG. 9 is a diagram illustrating a conventional optical pick-up device. (a) is a plan view of the optical pick-up device. (b) is a back view thereof.
Figure 10:
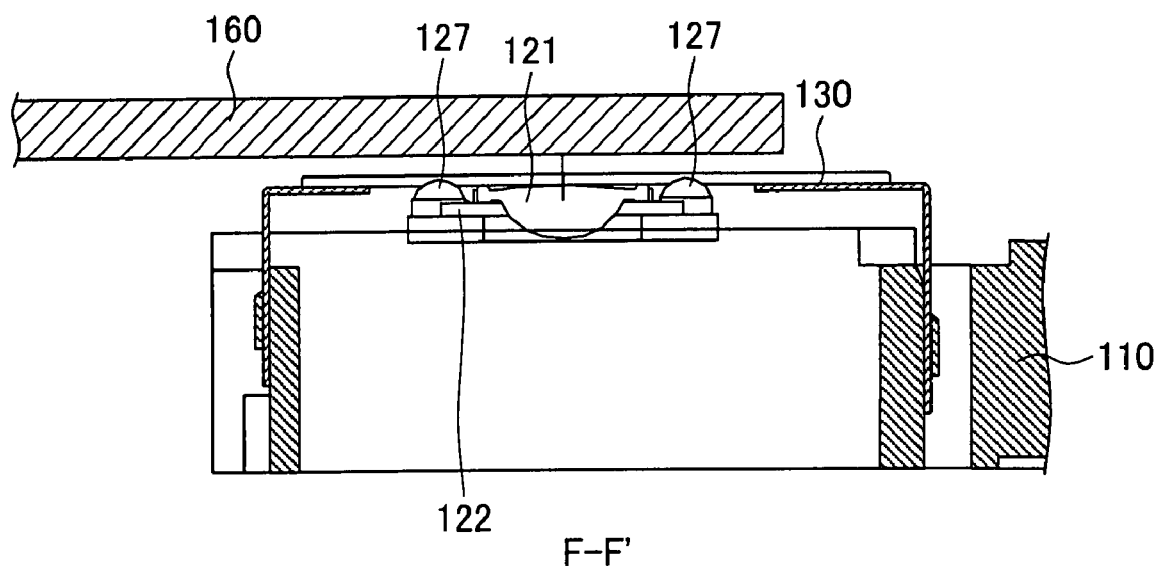
FIG. 10 is a cross sectional view of the conventional optical pick-up device and is a cross sectional view illustrating a cross section taken along F-F' of (a) of FIG. 9.
Figure 11:
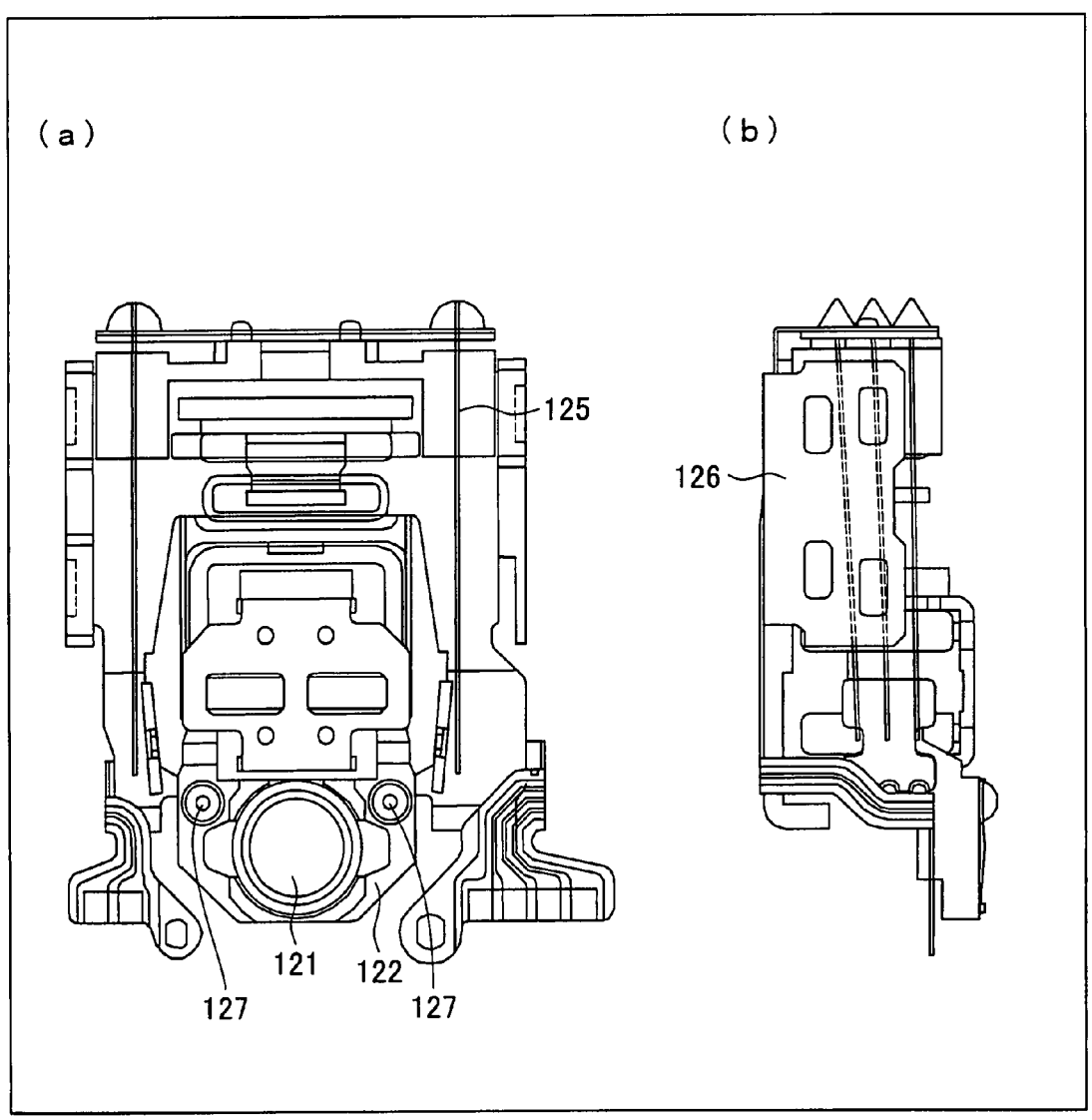
FIG. 11 is a diagram illustrating the conventional optical pick-up device. (a) is a plan view of an actuator unit. (b) is a side view of the actuator unit.

As illustrated in FIG. 8, a decorative board 19 may be provided on the protective cover section 11 after the integral formation of the protective cover section 11 and the housing 10. FIG. 8 is a diagram illustrating an arrangement in which the decorative board 19 is provided additionally in the arrangement as illustrated in FIG. 3. (a) of FIG. 8 is a plan view of the optical pick-up device. (b) of FIG. 8 is a cross sectional view illustrating a cross section taken along E-E' of (a) of FIG. 8. (c) of FIG. 8 is a plan view of the decorative board 19.

A material for the decorative board 19 is not especially specified. However, the decorative board 19 is provided at a lower position than the protrusions 12 through 14 or the like. The decorative board 19 may be provided with a hole through which the previously formed protrusions 12 through 14 pass so that the decorative board 19 is provided on the protective cover section 11. A fixing method of the decorative board 19 is not especially specified. Examples of the fixing method are: pressing the decorative board 19 onto the protective cover section 11 so that the protrusions 12 through 14 pass through holes of the decorative board 19; fixing the decorative board 19 with double face adhesive tape; fixing the decorative board 19 with an adhesive; engaging a hook provided to the decorative board 19 with a hook provided to the housing 10; and fastening the decorative board 19 with a screw. Alternatively, the decorative board 19 may be formed simply as a sheet with an adhesive tape.

Because the decorative board 19 can be arranged separately from the component that needs strength in the optical pick-up device, the decorative board 19 can be a component having a different color from the color of the protective cover section 11, which is integrally formed with the housing 10. This can improve a design of an external appearance of the optical pick-up device.

The decorative board 19 can be provided in the arrangement as illustrated in FIG. 4, or the arrangement as illustrated in FIG. 5.

The present invention should not be narrowly interpreted within the limits of such embodiments and concrete examples, but rather may be applied in many variations within the spirit of the present invention, provided such variations do not exceed the scope of the patent claims set forth below. Moreover, a combination of the technical means explained in different embodiments above is also included in the technical scope of the present invention.

As mentioned above, an optical pick-up device of the present invention is an optical pick-up device that reproduces/records information from/onto an optical information storage medium by means of a laser beam, the optical pick-up device including: a housing, which is a cabinet covering inner components of the optical pick-up device, having an opening section at least on a surface that faces the optical information storage medium when the optical information storage medium is set in place; and a protective cover that protects the opening section of the housing, wherein the protective cover is integrally formed with the housing.

This makes it possible to provide an optical pick-up device that can realize (i) a stable component accuracy, (ii) improvement in productivity, and (iii) low cost, without damaging an optical disk.

In the optical pick-up device of the present invention, it is preferable that the protective cover includes a protrusion provided on a surface of the protective cover which surface faces the optical information storage medium, for preventing a collision between the optical information storage medium and the protective cover. It is also preferable that the protrusion is formed on an entire periphery of the objective lens of the optical pick-up device.

According to the arrangement, when vibration or an impact occurs during recording/reproducing of information onto/from the optical information storage medium having a lot of run out, the optical information storage medium comes into contact with the protrusion, without colliding with a corner or a surface of the protective cover. This prevents a collision between the optical information storage medium and the protective cover. Consequently, this makes it possible to prevent damage to the optical information storage medium and loss of information stored in the optical information storage medium.

In the optical pick-up device of the present invention, it is preferable that a top end of the protrusion is chamfered so as to have a curved surface.

With this arrangement, a surface of the protrusion which surface collides with the optical disk is a curved surface. This makes it possible to decrease damage to the optical disk when the protrusion collides with the optical disk.

In the optical pick-up device of the present invention, the protrusion doubles as a member for determining a position of the wiring board by passing through the wiring board of the optical pick-up device.

The optical pick-up device of the present invention may further include: a decorative board provided on the protective cover, wherein the decorative board is provided at a lower position than the top end of the protrusion.

In the optical pick-up device of the present invention, it is preferable that the protective cover is formed on the housing over a region where the lens driving section of the optical pick-up device is provided.

According to the arrangement, the protective cover is formed over the region where the lens driving section is provided. This can improve strength of the entire housing.

In the optical pick-up device of the present invention, it is preferable that the protective cover includes an adhesive filling hole, and the lens driving section of the optical pick-up device is fixed with an adhesive to the housing. Moreover, the protective cover may include an adhesive filling hole and an adhesive storing section, and the lens driving section of the optical pick-up device is fixed with the adhesive to the housing.

In the optical pick-up device of the present invention, it is preferable that the housing and the protective cover are made of resin so as to be integrally formed.

According to the arrangement, general-purpose metal-replacement resin can be used as a material for the housing. Therefore, the housing can be produced easily by molding.

An optical recording/reproducing apparatus of the present invention includes the above-mentioned optical pick-up device, as mentioned above.

This brings about the effect of providing an optical recording/reproducing apparatus that can realize (i) a stable component accuracy, (ii) improvement in productivity, and (iii) low cost, without damaging an optical disk.

The optical pick-up device of the present invention can be preferably applied to, for example, an optical recording/reproducing apparatus, a DVD recorder, a TV/Video multifunction machine, each of which records and/or reproduces optical information onto/from a storage medium such as an optical disk. Accordingly, the optical pick-up device of the present invention can be preferably applied to fields of various electric devices or electrical products for uses ranging from domestic use to industrial use.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical pick-up device that reproduces/records information from/onto an optical information storage medium by means of a laser beam, the optical pick-up device comprising:
   a housing, which is a cabinet covering inner components of the optical pick-up device, having an opening section at least on a surface that faces the optical information storage medium when the optical information storage medium is set in place;
   a protective cover that protects the opening section of the housing and includes a protrusion on a surface of the protective cover configured to prevent a collision between the optical information storage medium and the protective cover, the surface facing the optical information storage medium; and
   a wiring board, wherein
   the protective cover is integrally formed with the housing,
   a top end of the protrusion is chamfered so as to have a curved surface, and
   the protrusion also functions as a member configured to determine a position of the wiring board by passing through the wiring board.

2. An optical recording/reproducing apparatus comprising an optical pick-up device according to claim 1.

* * * * *